March 24, 1970 M. P. BORDONARO 3,502,904
PULSE-FREQUENCY TO D.C. CONVERTER
Filed June 12, 1967
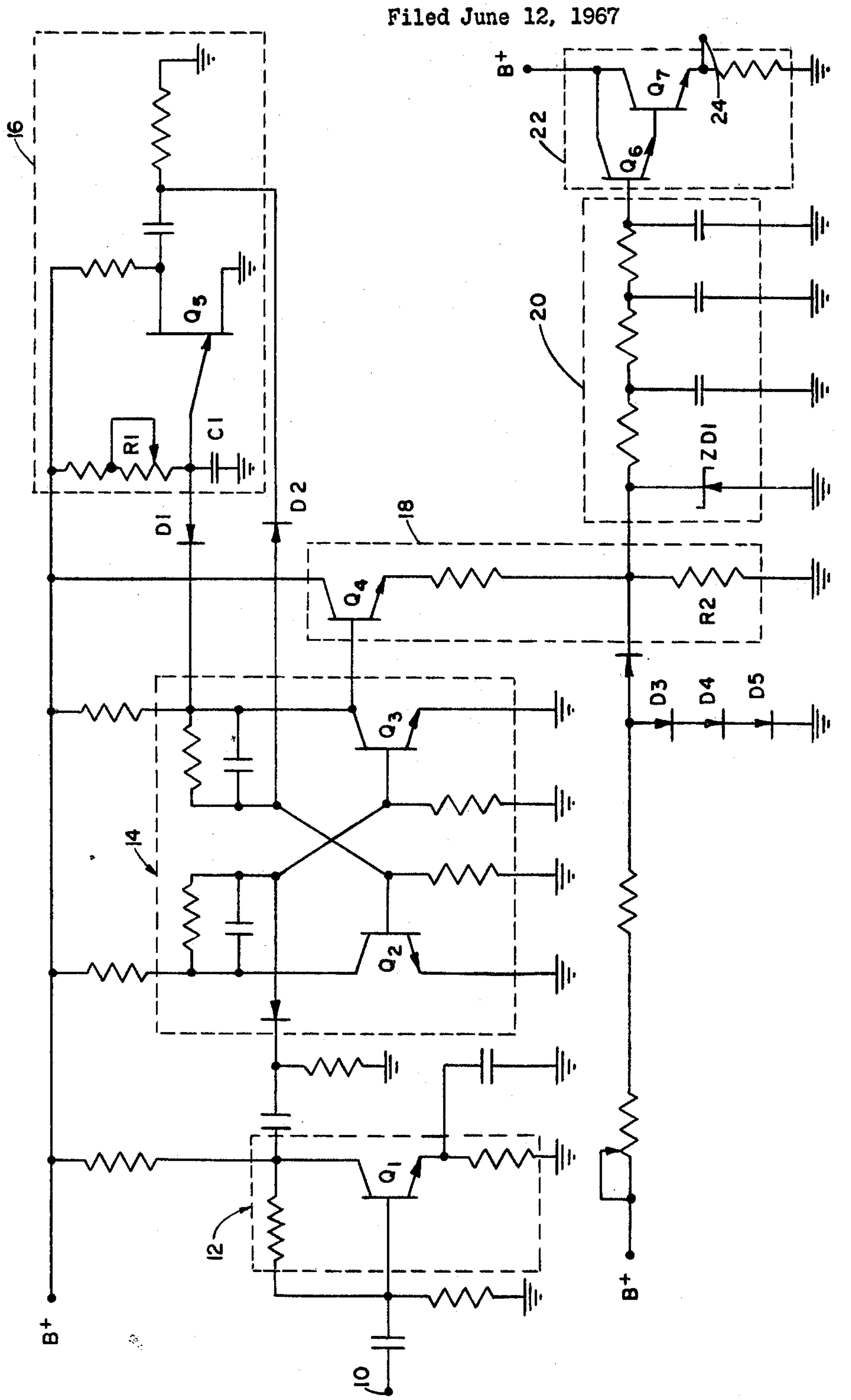

United States Patent Office 3,502,904

Patented Mar. 24, 1970

3,502,904

PULSE-FREQUENCY TO DC CONVERTER

Michael P. Bordonaro, Middletown, Conn., assignor to Combustion Engineering, Inc., Windsor, Conn., a corporation of Delaware Filed June 12, 1967, Ser. No. 645,242

Int. Cl. H03k 5/20

U.S. Cl. 307—233 6 Claims

ABSTRACT OF THE DISCLOSURE

Circuitry for converting a pulsating input signal to a D.C. voltage having an amplitude proportional to the pulse repetition rate. A bistable circuit is set in response to input pulses. Setting of the bistable circuit gates a pulse generating circuit which, after a preselected delay, resets the bistable circuit. Setting and resetting of the bistable circuit results in the generation of output pulses of a fixed amplitude and desired shape. These identical pulses, whose repetition rate varies with the input pulse frequency, are clamped and applied to a filter.

BACKGROUND OF THE INVENTION

Field of the invention

The present invention relates to the conversion of an alternating input signal to a D.C. voltage commensurate with the input signal frequency. More particularly, the present invention is directed to the conversion of a pulse train into a D.C. signal whose magnitude is indicative of the pulse repetition rate. Accordingly, the general objects of the present invention are to provide novel and improved methods and apparatus of such character.

Description of the prior art

While not limited thereto in its utility, the present invention is particularly well suited for use in systems wherein it is necessary or desirable to linearly convert signals associated with rotating machinery, such as the output pulse train from a tachometer generator, to a proportional D.C. voltage. Among the requirements for such frequency converters is that their output be independent of variations in input signal amplitude and also be insensitive to supply voltage variations. While some of the prior art frequency converters possess these desirable attributes, the ripple in their output signals approaches the signal level thereby requiring extensive filtering.

SUMMARY OF THE INVENTION

The present invention overcomes the aforementioned requirement for extensive filtering and, in so doing, provides a novel and improved frequency to direct current converter. This novel converter includes means for providing output signals having a rapid rise and fixed magnitude in response to the application of input pulses of a first polarity. These output signals are simultaneously applied to a filter and to means which provides feedback control over the duration of the signals. By strictly controlling the duration of the signals and fixing their magnitude, the input to the filter becomes a pulse train whose only variable is pulse repetition rate. The pulse repetition rate is controlled by the input pulse frequency. By elimination of all variables save pulse repetition rate, a direct current signal with low ripple is provided at the output of the filter and the magnitude of this signal is commensurate with the input pulse frequency.

BRIEF DESCRIPTION OF THE DRAWING

In the drawing, the single figure is a schematic diagram of a preferred embodiment of the present invention.

DESCRIPTION OF THE PREFERRED EMBODIMENT

Input pulses to the circuit shown in the figure are applied to an input terminal 10 from a pulse generator, such as a conventional tachometer, not shown. The tachometer input pulses applied at terminal 10 are coupled to a preamplifier 12. Amplified input pulses of a first polarity are delivered from amplifier 12 to a bistable circuit 14. The amplified input pulses cause switching of bistable circuit 12 which, in the manner well known in the art, thus provides signals of fixed magnitude and rapid rise time at its output terminal. These output signals are applied to a switching or pulse generating circuit 16 and, via an emitter follower 18, to a filter circuit 20. Output pulses generated by circuit 16 are fed back to bistable circuit 14 and, by means of resetting the bistable circuit, control the duration of the signals (pulses) applied to filter circuit 20. The direct current signal appearing at the output of filter circuit 20 may, if desired, be passed through an output circuit, such as amplifier 22, having a high input impedance before being applied to output terminal 24. Use of an output circuit with high input impedance insures against loading the filter.

Preamplifier 12 comprises merely an NPN type transistor Q1 which is rendered conducted by the application of positive input pulses to its base. Conduction of transistor Q1 causes its collector voltage to drop and the resulting negative pulses are coupled to the bistable circuit 14.

Circuit 14 may comprise a bistable multivibrator consisting of transistors Q2 and Q3. Transistor Q3 is normally conducting while transistor Q2 is normally "off." Negative pulses appearing at the collector at transistor Q1 are coupled to the base of transistor Q3 thus turning transistor Q3 "off" and, in the manner well known in the art, turning transistor Q2 "on." Restated, positive going pulses applied to the base of transistor Q1 turn transistor Q3 "off" and transistor Q2 "on."

The collector of transistor Q3 is coupled, via a normally forward biased diode D1, to a capacitor C1 in switching circuit 16. Capacitor C1 is connected, via a potentiometer R1, to the power supply, not shown, for the converter. The voltage across capacitor C1 is applied to the base of a unijunction transistor Q5 which also forms a part of the trigger circuit. With transistor Q3 of the multivibrator in the "on" condition, the base of the unijunction transistor Q5 is clamped approximately to ground and capacitor C1 cannot charge to the firing potential of the unijunction. Under these conditions, unijunction transistor Q5 is nonconductive. When a positive going input pulse is applied to the converter thereby causing transistor Q3 to be switched "off," coupling diode D1 will be reverse biased and capacitor C1 will begin to charge. The charging time of capacitor C1 is controlled by the setting of potentiometer R1. Restated, potentiometer R1 varies the RC time constant of the circuit comprising the potentiometer and capacitor C1. As capacitor C1 charges, the positive D.C. voltage across it rises. When this voltage is sufficient to forward bias the PN junction of unijunction transistor Q5, transistor Q5 will conduct and capacitor C1 will be discharged very rapidly. The discharge of capacitor C1 through unijunction transistor Q5 results in a generation of a negative going pulse which is coupled via diode D2 to the base of transistor Q2 in the bistable circuit 14. This negative going pulse will turn transistor Q2 "off" thereby resulting in the turning of transistor Q3 back "on." The turning of transistor Q3 back "on" again forward biases diode D1 and thus aids in the complete discharge of capacitor C1. As will now be seen, the time constant of the RC circuit comprising potentiometer R1 and capacitor C1 will determine the width of the output pulse from bistable circuit 14, the bistable circuit 14 alternately being switched by positive going input pulses (amplifier 12 negative output pulses) and negative pulses generated by switching circuit 16.

It should be noted that the multivibrator 14 may be in the "set" condition when power is initially applied to the circuit. Should this be the case, capacitor C1 will immediately begin to charge and the unijunction transistor Q5 will fire thus resetting the multivibrator to the Q2 "off," Q3 "on" condition. The circuit is then ready to accept the first input pulse.

The output pulses generated by bistable circuit 14 are applied to filter 20 via an emitter follower circuit 18. This is accomplished by direct coupling of the collector of transistor Q3 to the base of emitter follower transistor Q4. The output of the emitter follower, as developed across resistor R2, is applied to the filter circuit. The filter circuit comprises a conventional three section RC filter. Connected across the three section filter is a Zener diode ZD1. Zener diode ZD1 clamps the output amplitude of the pulses developed across resistor R2 of the emitter follower 18 and this clamping action filters out noise which is superimposed on the multivibrator output pulses. A direct current output voltage having very low ripple may be obtained through the use of an RC filter since, in accordance with the present invention, the input to the filter comprises pulses having constant amplitude, duration and shape. The Zener diode ZD1 insures that the amplitude of the input pulses to the filter will remain constant even though the effects of operating temperature or power supply variations may cause slight changes in the amplitude in the output of bistable circuit 14. Resistor R2 also provides a discharge path for the capacitance associated with the Zener diode and thus improves the linearity of the circuit.

The D.C. voltage at the output of filter 20 is applied to a linear low frequency amplifier 22. In the embodiment disclosed, amplifier 22 is a direct coupled, cascaded emitter follower amplifier having a gain of less than one and employing a pair of transistors Q6 and Q7 connected in a Darlington circuit configuration. The Darlington circuit is characterized by a high input impedance and thus the amplifier does not load the filter. It is to be noted that series connected diodes D3, D4, and D5 are connected in parallel with filter circuit 20. These series connected diodes provide temperature compensation and bias voltage for transistors Q6 and Q7. Through the use of diodes D3, D4 and D5, the voltage at the input to filter circuit 20 will track temperature induced variations in the gain of transistors Q6 and Q7.

As will now be obvious to those skilled in the art, the present invention provides for the generation, from input pulses of any shape, a pulse train wherein the only variable is the pulse repetition rate. The pulse repetition rate is controlled solely by the input pulse frequency. Accordingly, the average value of the thus generated pulse train is a direct current voltage proportional to the input pulse frequency. This average value may be obtained through use of an inexpensive RC filter since all variables save pulse repetition rate have been eliminated from the filter input.

While a preferred embodiment has been shown and described, various modifications and substitutions may be made without departing from the spirit and scope of the present invention. Accordingly, the present invention has been described by way of illustration and not limitation.

What is claimed is:

1. Apparatus for converting a pulsating input signal to a direct current output signal having a magnitude proportional to the frequency of the input signal, said apparatus comprising:

first means for providing output signals of a first amplitude in response to the application of input pulses of a first polarity thereto;

means for controlling the duration of the signals provided by said first means, said duration controlling means being responsive to the generation of an output signal by said first means and providing in response to said output signal a control signal which causes said first means to terminate generation of said output signal whereby the magnitude and duration of the output signals from said first means remain constant regardless of the frequency of the input signals thereto while the pulse repetition rate of said output signals varies with input pulse frequency;

an RC filter circuit having input and output terminals;

Zener diode means connected to the input of said filter circuit for clamping the input to said filter circuit to a preselected level;

temperature compensation means connected to the input terminal of said filter circuit;

linear amplifier means having an input terminal connected to the output terminal of said filter circuit, said amplifier means having a high input impedance; and emitter follower means for applying the output pulses from said first means to said filter circuit input terminal.

2. The apparatus of claim 1 wherein said first means comprises:

a trigger circuit having two input terminals and two stable operating states, the input pulses being applied to one of said input terminals to cause the circuit to assume a second operating state whereby an output signal will be delivered to said pulse duration controlling means and to said filter means, the control signals from said pulse duration controlling means being applied to the other of said input terminals to cause said trigger circuit to return to its initial operating state.

3. The apparatus of claim 2 wherein said pulse duration controlling means comprises:

pulse generator means, said pulse generator means generating said control signals; and means responsive to the assumption of said second conductive state by said trigger circuit for gating said pulse generator means.

4. The apparatus of claim 3 wherein said gating means comprises:

means for providing an output signal of sufficient magnitude to gate said pulse generator means a preselected time after said trigger circuit assumes its second conductive state.

5. The apparatus of claim 4 wherein said output signal providing means comprises:

an RC circuit having an adjustable time constant.

6. The apparatus of claim 5 wherein said pulse generator means comprises:

a switching circuit including a unijunction transistor having a control electrode and an output electrode, said control electrode being connected to said adjustable time constant RC circuit and said output electrode being coupled to said other of said trigger circuit input terminals.

References Cited

UNITED STATES PATENTS

| | | | |
|---|---|---|---|
| 2,940,052 | 6/1960 | Van Winkle | 328—140 XR |
| 3,349,255 | 10/1967 | McAvoy | 307—273 XR |

DONALD D. FORRER, Primary Examiner

JOHN ZAZWORSKY, Assistant Examiner

U.S. Cl. X.R.

307—274, 261; 328—140.